Oct. 31, 1961   G. K. HAUSE   3,006,148
TRANSMISSION PUMP SYSTEM
Filed Oct. 6, 1958

INVENTOR.
Gilbert K. Hause
BY
Robert B. Gerhardt
ATTORNEY

3,006,148
TRANSMISSION PUMP SYSTEM
Gilbert K. Hause, Franklin, Mich., assignor to General Motors Corporation, Detroit, Mich., a corporation of Delaware
Filed Oct. 6, 1958, Ser. No. 765,416
3 Claims. (Cl. 60—52)

This invention relates to fluid supply systems and more particularly to fluid pressure supply systems for use with motor vehicle transmissions.

Automatic transmissions and other transmissions utilizing fluid pressure actuated elements usually require a source of fluid under pressure to initially establish a drive or non-neutral condition in the transmission. It is common practice to provide dual pumps for supplying fluid to the transmission, one of the pumps being driven by the transmission input shaft, which in the case of a motor vehicle transmission is engine driven, and the other pump being operated by the output or driven shaft, which in the case of a motor vehicle transmission is connected to the drive wheels of the vehicle.

Various methods have been utilized to increase the efficiency of the transmission by minimizing parasitic losses such as occur in operating accessory members such as the fluid supply pumps. Thus with the output shaft or vehicle stationary, the engine driven pump must have a large capacity to provide sufficient volume and pressure to actuate the various control elements in the transmission to transmit full engine torque and, therefore, must be a relatively large pump having a relatively large horsepower drain on the power available from the engine. On the other hand, if the engine is stopped and it is desired to start the engine by pushing or towing the vehicle it is necessary to have a second or auxiliary source of fluid under pressure that is independent of engine operation, that is, responsive to vehicle movement.

Some systems employed to save pump power losses have utilized control valves that act to unload or exhaust the pressure from the engine driven pump when the vehicle is travelling at a speed sufficiently high to cause the rear or output shaft pump to supply the necessary fluid under pressure. Other systems provide a variable displacement engine driven pump that will automatically decrease its displacement as the rear pump increases its output. While each of these methods acts to unload one of the pumps by reducing the pressure the pump is working against, the pump is still mechanically driven and, hence, inserts parasitic losses in the drive train. It would be desirable to provide a system wherein a single pump provides all of the ordinary fluid under pressure and wherein an auxiliary or emergency pump is actuated or driven only if the main pump is inoperative where the engine is stalled.

It is therefore an object of the invention to provide a fluid supply system for a transmission having a main pump and an auxiliary pump that is automatically disconnected from its drive whenever the main pump is in operation.

It is a further object to provide an auxiliary pump for a transmission fluid supply system wherein a piston type pump is de-activated by pressure from a main pump.

These and other objects and advantages will be readily apparent from the following specification and drawings of one embodiment of the invention and in which.

Figure 1:
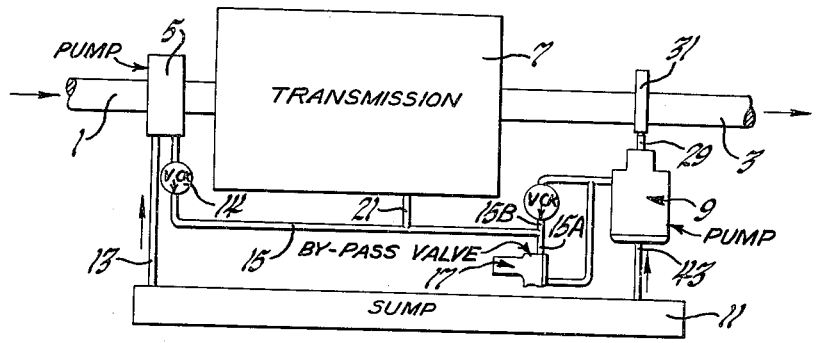
FIGURE 1 is a schematic illustration of the fluid supply system.

Referring to FIGURE 1 which shows one example of the invention, the number 1 represents the transmission input shaft which in the case of a motor vehicle transmission would be connected to the engine, and 3 the transmission output shaft which in the case of a motor vehicle would be connected to the drive wheels. A main pump 5 is mounted to be driven by the input shaft 1. The shaft 1 also drives the transmission proper 7 which may include fluid torque transmittting elements, fluid servo controlled mechanical gearing, and/or other fluid operated devices.

The auxiliary or rear pump, generally indicated by 9, is adapted to be operated only under certain conditions by the output shaft 3. A common sump 11 is provided as a reservoir for fluid, such as oil, for both of the pumps 5 and 9 and acts to receive leakage and exhaust oil from the transmission system. The front or main pump 5 has a suction line 13 connected to the sump 11 and discharges through a check valve 14 to a pressure or discharge line 15. Pipe 15 connects to a transmission fluid supply line 21 and also branches into pipes 15A and 15B leading to a rear pump by-pass valve generally indicated by 17 and a rear pump check valve generally indicated by 19, respectively.

Figure 2:
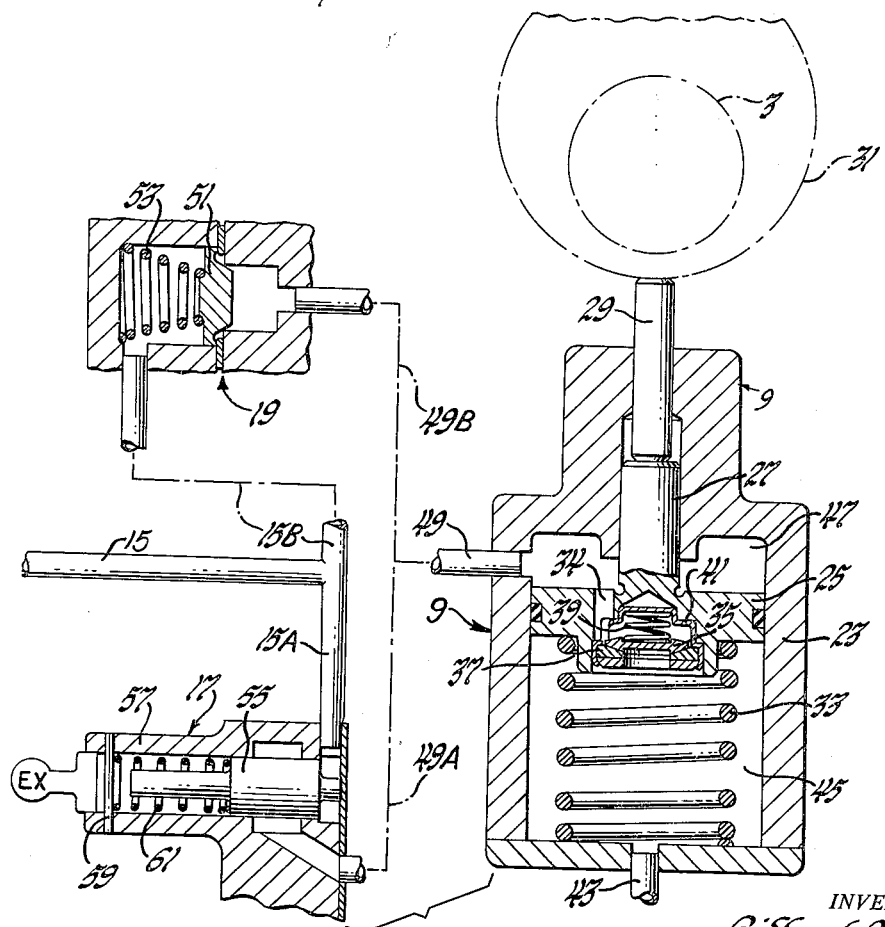
FIGURE 2 is an enlarged cross-sectional view of certain parts of the system.

Referring now to FIGURE 2 which shows details of the rear pump 9, the rear pump by-pass valve 17, and the rear pump check valve 19, it will be seen that the rear pump is a piston type reciprocating pump that operates by displacing fluid from an inlet side of the piston through a check valve in the piston to the pressure or outlet side of the piston. The rear pump 9 consists of a stationary housing 23 forming a cylinder for a piston 25 having a piston rod 27 formed integral therewith. A push rod 29 reciprocably mounted in the housing 23 acts to at times transmit motion from a cam 31 driven by the output shaft 3 to the piston rod 27. A spring 33 acts on the low pressure side of piston 25 to urge it upward as seen in the figure until the piston rod 27, push rod 29, and cam 31 are in operative engagement.

Piston 25 has a series of openings 34 therethrough, only one of which is shown in FIGURE 2. The openings 34 are normally closed by a check valve 35 held against an annular valve seat 37 by a spring 39. The valve seat 37, valve 35 and spring 39 are all held in the piston by a stepped cylindrical retainer member 41. This type of check valve is similar to that commonly used in fuel pumps on automotive vehicles.

A suction or inlet passage 43 connects the low pressure chamber 45 with the sump 11 while the high pressure chamber 47 has an outlet passage 49 that branches into passages 49A and 49B leading to the rear pump by-pass valve 17 and rear pump check valve 19 respectively.

As seen in FIGURE 2 the rear pump check valve 19 includes a valve member 51 urged by a spring 53 to close communication between the branch passages 15B and 49B but will allow fluid to pass from 49B to 15B whenever the pressure in 49B exceeds that in 15B enough to move the valve 51 against the force of spring 53.

The rear pump by-pass valve 17 includes a cylindrical valve member 55 reciprocably mounted in the stationary housing 57. A pin 59 forms a retainer for a spring 61 that urges the valve member 55 to the right or closed position cutting off communication between the branch passages 15A and 49A. Whenever the pressure in the passage 15 and, hence, 15A, is greater than an amount determined by the strength of spring 61 the valve 55 will be forced against the spring, and pressure from line 15 will pass into branch 49A, outlet passage 49 and into the pressure chamber 47 to force the piston 25 downward against the spring 33. This pressure for example may be around 22 p.s.i.

Operation

The fluid pressure supply system operates as follows: During normal operation of the transmission and vehicle, the engine and input shaft 1 will be rotating and will drive the pump 5 to produce a positive pressure in the line 15 to supply the transmission fluid system through the pipe 21. This pressure is usually more than 22 p.s.i. and therefore will be sufficient to open the by-pass valve 17 and allow the high front pump pressure to act through branch 49A, pipe 49 on the piston 25 to force the piston down against the spring 33. Rotation of the output shaft 3 and cam 31 will then not cause pumping action of the piston 25 and rod 27 since the piston will be held in a position such that the push rod 29 cannot contact both the cam 31 and piston rod 27. Thus under normal conditions there is no rear pump in operation and no parasitic losses from a rear pump.

If, for some reason, it is desired to start the engine by movement of the vehicle such as by pushing or towing, operation of the output shaft 3 will cause rotation of the cam 31 and, since the front pump 5 is not producing fluid pressure under dead engine conditions, the spring 33 will urge the piston 25 and rod 27 against the push rod 29 and cause it to contact the cam 31. Rotation of the cam 31 will then, during one-half revolution of the shaft 3, cause the piston 25 to be forced downwardly closing check valve 51 and creating a partial vacuum in the expanding chamber 47. Atmospheric air pressure will act on oil in the sump 11 to force the same into chamber 45 and past check valve 37 through the openings 34 into chamber 47. During the second half revolution of the output shaft 3, the spring 33 will force the piston 25 upwardly displacing the fluid in chamber 47 through the outlet pipe 49, branch 49B past the check valve 19 into the pipe 15. During the piston upstroke, chamber 45 is expanding and atmospheric air pressure forces oil from the sump into chamber 45 where it is available for passage through valve 35 on the next downstroke of the piston 25. The pressure created in pipe 15B can then act through the pipes 15 and 21 to actuate the fluid elements in the transmission and thus connect the output shaft 3 with the input shaft 1 to cause the engine to be turned by the driving wheels of the vehicle. The front pump check valve 14 prevents fluid from the rear pump from discharging through the inactive front pump during this rear pump operation.

Once the engine has started and is driving the front pump 5 the pump is rotating sufficiently fast to cause it to produce fluid pressure sufficient, e.g. above 22 p.s.i., to open the valve 55, and the front pump pressure will then force the piston 25 down into its inoperative position and the rear pump thereafter will be inactive.

Since the rear pump is actuated only very occasionally during dead engine conditions and as the torque transmitted through the fluid actuated elements is relatively small it is necessary only to supply a limited pressure and quantity of fluid. The pump can therefore be relatively small and inexpensive to manufacture as opposed to the larger type rear pumps heretofore used that must operate a good portion of the time during operation of the transmission. The invention provides for simple automatic rear pump operation whenever the front pump is inoperative and yet adds no parasitic losses to the transmission during normal operation.

Modifications and other applications of the invention will be readily apparent to those skilled in the art, the invention being limited only by the following claims.

What is claimed is:

1. A fluid pressure supply for a transmission fluid pressure control system, a first pump adapted to be driven by a rotating element of the transmission for supplying fluid under pressure to said control system, a second pump adapted to be actuated by another rotating element of the transmission independent of said first rotating element for supplying fluid under pressure to said control system, means in said second pump for disconnecting said second pump from the rotating element in response to a predetermined discharge pressure, a first valve responsive to fluid pressure from said first pump to connect said pressure from said first pump to said means in said second pump to hold the second pump in a non-actuated position, and a second valve responsive to actuation of said second pump to connect said second pump discharge pressure to said control system.

2. A fluid pressure supply for a transmission fluid pressure control system, a first pump adapted to be driven by a rotating element of the transmission for supplying fluid under pressure to said control system, a second pump adapted to be actuated by another rotating element of the transmission independent of said first rotating element for supplying fluid under pressure to said control system, means in said second pump for disconnecting said second pump from the rotating element in response to a predetermined discharge pressure, a first valve responsive to a predetermined fluid pressure from said first pump to connect said pressure from said first pump to said means in said second pump to hold the second pump in a non-actuated position, and a second valve responsive to a predetermined discharge pressure from said second pump to connect said second pump discharge pressure to said control system.

3. A source of fluid under pressure for a transmission having input and output elements and a fluid pressure control system, including a cam member rotatable with an output element of the transmission, a first pump including a stationary cylinder having a fluid inlet adjacent one of its ends connected to a source of fluid and an outlet connected to the pressure control system adjacent the other of its ends, a piston reciprocably mounted in said cylinder, biasing means acting on said piston to urge it toward the outlet end of said cylinder, an opening in said piston communicating said inlet and outlet cylinder ends, a first check valve in said opening allowing passage of fluid from said inlet end to said outlet end, a member adapted to be reciprocated by said cam independently of said piston and engageable with said piston for moving the same in the other direction against said biasing means to displace fluid from said inlet end through said first check valve to said outlet end and a second check valve between said outlet and said control system allowing passage of fluid from said outlet to said control system when said piston is urged in said one direction by said biasing means, a second pump actuated by an input element of the transmission for supplying fluid under pressure to said control system, a valve between said second pump and the outlet of said first pump, said last mentioned valve responsive to a predetermined pressure supplied by said first pump to connect said first pump pressure to the outlet of said first pump to force said piston against said biasing means and render the biasing means ineffective to move said piston toward outlet end and thereby against said member whereby rotation of said cam will not cause pumping movement of said piston.

References Cited in the file of this patent

UNITED STATES PATENTS

| | | |
|---|---|---|
| 2,021,857 | Hueber | Nov. 19, 1935 |
| 2,064,750 | Hurst | Dec. 15, 1936 |
| 2,332,593 | Nutt et al. | Oct. 26, 1943 |
| 2,472,802 | Bentley | June 14, 1949 |
| 2,691,940 | McFarland | Oct. 19, 1954 |
| 2,737,824 | Livermore | Mar. 13, 1956 |
| 2,884,813 | Kelley | May 5, 1959 |